(12) United States Patent
Rafalovich et al.

(10) Patent No.: US 6,904,761 B2
(45) Date of Patent: Jun. 14, 2005

(54) METHOD AND APPARATUS TO CONTROL HUMIDITY IN A REFRIGERATOR

(75) Inventors: Alexander Pinkus Rafalovich, Louisville, KY (US); Ziqiang Hu, Prospect, KY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/249,032

(22) Filed: Mar. 11, 2003

(65) Prior Publication Data

US 2004/0177640 A1 Sep. 16, 2004

(51) Int. Cl.[7] .......................... F25B 49/00; F25D 17/04; F25D 11/00
(52) U.S. Cl. .......................... 62/176.1; 62/407; 62/409; 62/412; 62/440
(58) Field of Search ................ 62/176.1, 407, 62/409, 408, 412, 440, 441

(56) References Cited

U.S. PATENT DOCUMENTS

| 2,029,153 A | * | 1/1936 | Burner | 62/91 |
|---|---|---|---|---|
| 2,216,873 A | * | 10/1940 | Browne | 454/183 |
| 2,477,756 A | * | 8/1949 | Lee | 62/186 |
| 2,568,268 A | * | 9/1951 | Booth | 62/285 |
| 3,167,931 A | * | 2/1965 | Bryson | 62/277 |
| 3,600,905 A | * | 8/1971 | Dymek et al. | 62/132 |
| 4,250,716 A | * | 2/1981 | Huffman | 62/180 |
| 4,358,934 A | * | 11/1982 | VanKirk | 62/180 |
| 4,602,488 A | * | 7/1986 | Kice | 62/309 |
| 4,850,206 A | * | 7/1989 | Larsen | 62/382 |
| 5,144,816 A | * | 9/1992 | Chase | 62/408 |
| 5,566,504 A | * | 10/1996 | Pitel | 49/28 |
| 5,946,919 A | * | 9/1999 | McKinney et al. | 62/3.7 |
| 6,301,913 B1 | * | 10/2001 | Schulak et al. | 62/248 |
| 2002/0033023 A1 | * | 3/2002 | Kroll et al. | 62/78 |

* cited by examiner

Primary Examiner—William C. Doerrler
(74) Attorney, Agent, or Firm—George L. Rideout, Jr.; Armstrong Teasdale LLP

(57) ABSTRACT

A refrigerator includes a refrigerating compartment configured to preserve food, the compartment including a plurality of walls forming a cavity, a door coupled to the compartment configured to cover the cavity when in a closed position, and a passageway positioned on at least one of the walls and the door such that air within the cavity is in flow communication with air outside the cavity when the door is in the closed position.

16 Claims, 5 Drawing Sheets

METHOD AND APPARATUS TO CONTROL HUMIDITY IN A REFRIGERATOR

BACKGROUND OF INVENTION

This invention relates generally to refrigerators, and more specifically, to controlling humidity in a refrigerator fresh food compartment.

At least some known refrigerators regulate the temperature of the fresh food compartment by opening and closing a damper established in flow communication with a freezer compartment, and by operating a fan to draw cold freezer compartment air into the fresh food compartment as needed to maintain a desired temperature in the fresh food compartment. The temperature of the evaporator surface in the freezer compartment is typically much lower than the air temperature in the fresh food compartment. This drives moisture from the fresh food compartment to the freezer compartment where it mostly freezes on the evaporator surface. This reduces the relative humidity in the fresh food compartment. Relative air humidity in the fresh food compartment of the refrigerator has a high influence on the fresh food quality. Deterioration of some foods such as vegetables, fruits, mushrooms, bread, and the like in a low humidity environment is rapid and irreversible.

As is well known with humidors, freshness of items that are stored at room temperatures is readily accomplished merely by sealing a storage container to prevent the entry of air. This is not effective, however, in a refrigerated environment where temperatures are maintained well below a normal room temperature of, for instance, 70 degrees. In known refrigerators, maintaining fresh food quality is a challenge. While covered crisper pans and meat storage pans are typically provided in the fresh food compartment to retard the drying out of items placed therein, there is no provision for controlling the relative humidity of the remainder of the fresh food compartment of the refrigerator.

SUMMARY OF INVENTION

In one aspect, a refrigerator includes a refrigerating compartment configured to preserve food, the compartment including a plurality of walls forming a cavity, a door coupled to the compartment configured to cover the cavity when in a closed position, and a passageway positioned on at least one of the walls and the door such that air within the cavity is in flow communication with air outside the cavity when the door is in the closed position.

In another aspect, a refrigerator includes a refrigerating compartment configured to preserve food, the compartment including a plurality of walls forming a cavity, a door coupled to the compartment configured to cover the cavity when in a closed position, and a gasket positioned between the compartment and the door when the door is in the closed position, and a passageway positioned in the gasket such that air within the cavity is in flow communication with air outside the cavity when the door is in the closed position.

In another aspect, a refrigerator includes a refrigerating compartment configured to preserve food, the compartment including a plurality of walls forming a cavity, a door coupled to the compartment configured to cover the cavity when in a closed position, and a user interface operationally coupled to the cavity, the interface configured to receive a relative humidity setting, and maintain the relative humidity within the cavity about the received relative humidity setting by controlling an exchange of outside air with the cavity.

In another aspect, a method for manufacturing a refrigerator includes forming a refrigerating compartment configured to preserve food, the compartment including a plurality of walls forming a cavity, coupling a door to the compartment such that the door covers the cavity when in a closed position, and coupling a passageway to at least one of the cavity and the door such that air within the cavity is in flow communication with air outside the cavity when the door is in the closed position.

DETAILED DESCRIPTION

Figure 1:
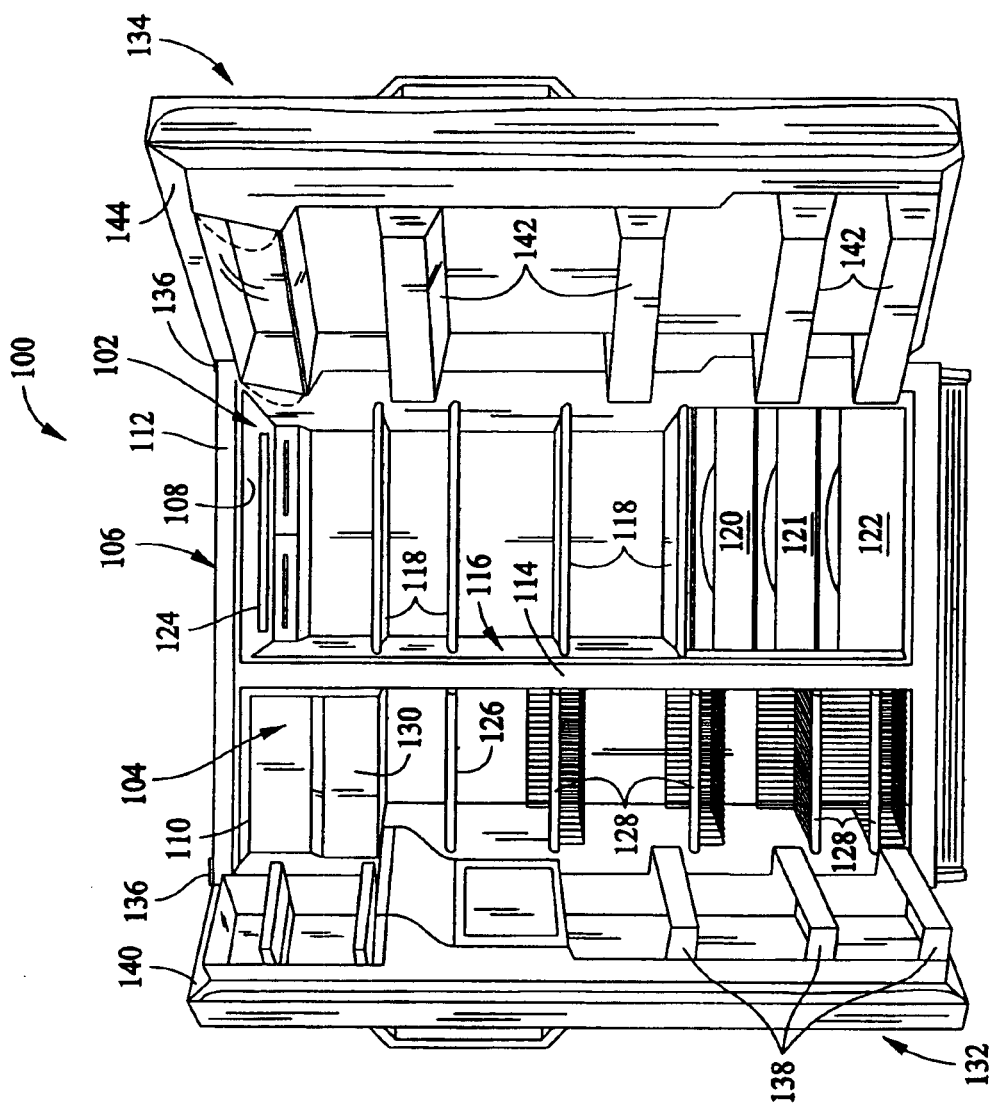
FIG. 1 is a perspective view of a refrigerator.

FIG. 1 illustrates an exemplary side-by-side refrigerator 100. It is contemplated, however, that the teaching of the description set forth herein is applicable to other types of refrigeration appliances, including but not limited to top and bottom mount refrigerators where humidity control in the fresh food compartment is desirable. The present invention is therefore not intended to be limited to any particular type or configuration of a refrigerator, such as refrigerator 100.

Refrigerator 100 includes a fresh food storage compartment 102 and freezer storage compartment 104, an outer case 106 and inner liners 108 and 110. A space between case 106 and liners 108 and 110, and between liners 108 and 110, is filled with foamed-in-place insulation. Outer case 106 normally is formed by folding a sheet of a suitable material, such as pre-painted steel, into an inverted U-shape to form top and side walls of case 106. A bottom wall of case 106 normally is formed separately and attached to the case side walls and to a bottom frame that provides support for refrigerator 100. Inner liners 108 and 110 are molded from a suitable plastic material to form freezer compartment 104 and fresh food compartment 106, respectively. Alternatively, liners 108, 110 may be formed by bending and welding a sheet of a suitable metal, such as steel. The illustrative embodiment includes two separate liners 108, 110 as it is a relatively large capacity unit and separate liners add strength and are easier to maintain within manufacturing tolerances. In smaller refrigerators, a single liner is formed and a mullion spans between opposite sides of the liner to divide it into a freezer compartment and a fresh food compartment.

A breaker strip 112 extends between a case front flange and outer front edges of liners. Breaker strip 112 is formed from a suitable resilient material, such as an extruded acrylo-butadiene-syrene based material (commonly referred to as ABS).

The insulation in the space between liners 108, 110 is covered by another strip of suitable resilient material, which also commonly is referred to as a mullion 114. Mullion 114 also preferably is formed of an extruded ABS material. It will be understood that in a refrigerator with separate mullion dividing an unitary liner into a freezer and a fresh food compartment, a front face member of mullion corresponds to mullion 114. Breaker strip 112 and mullion 114 form a front face, and extend completely around inner peripheral edges of case 106 and vertically between liners 108, 110. Mullion 114, insulation between compartments, and a spaced wall of liners separating compartments, sometimes are collectively referred to herein as a center mullion wall 116.

Shelves 118 and slide-out drawers 120, 121 normally are provided in fresh food compartment 102 to support items being stored therein. A bottom drawer or pan 122 partly forms a quick chill and thaw system (not shown in FIG. 1) selectively controlled, together with other refrigerator features, by a microprocessor (not shown) according to user preference via manipulation of a control interface 124 mounted in an upper region of fresh food storage compartment 102 and coupled to the microprocessor. Shelves 126 and wire baskets 128 are also provided in freezer compartment 104. In addition, an ice maker 130 may be provided in freezer compartment 104.

A freezer door 132 and a fresh food door 134 close access openings to fresh food and freezer compartments 102, 104, respectively. Each door 132, 134 is mounted by a top hinge 136 and a bottom hinge (not shown) to rotate about its outer vertical edge between an open position, as shown in FIG. 1, and a closed position (not shown) closing the associated storage compartment. Freezer door 132 includes a plurality of storage shelves 138 and a sealing gasket 140, and fresh food door 134 also includes a plurality of storage shelves 142 and a sealing gasket 144.

Figure 2:
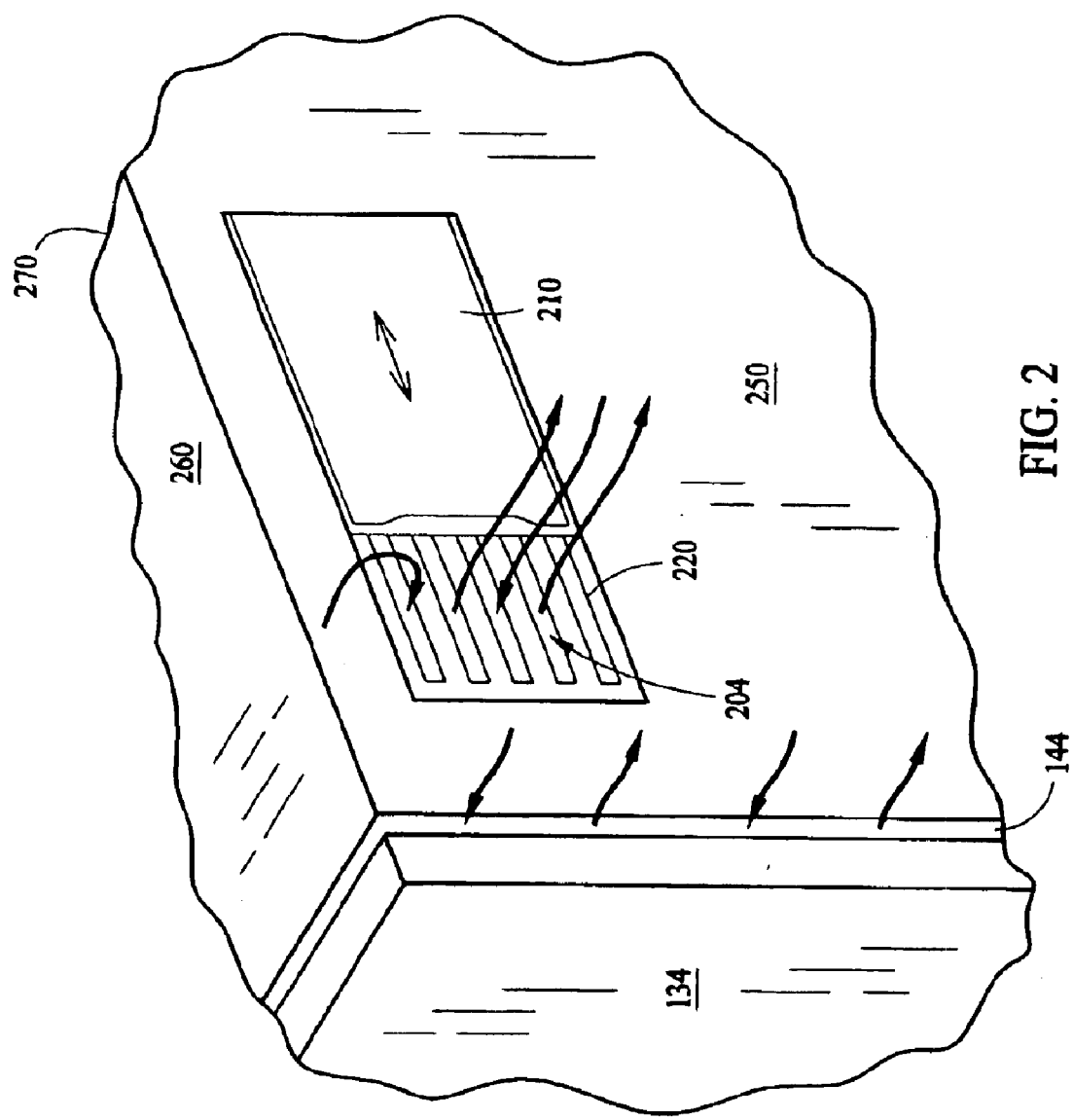
FIG. 2 is a partial perspective view of an exterior surface of the refrigerator of FIG. 1.
Figure 4:
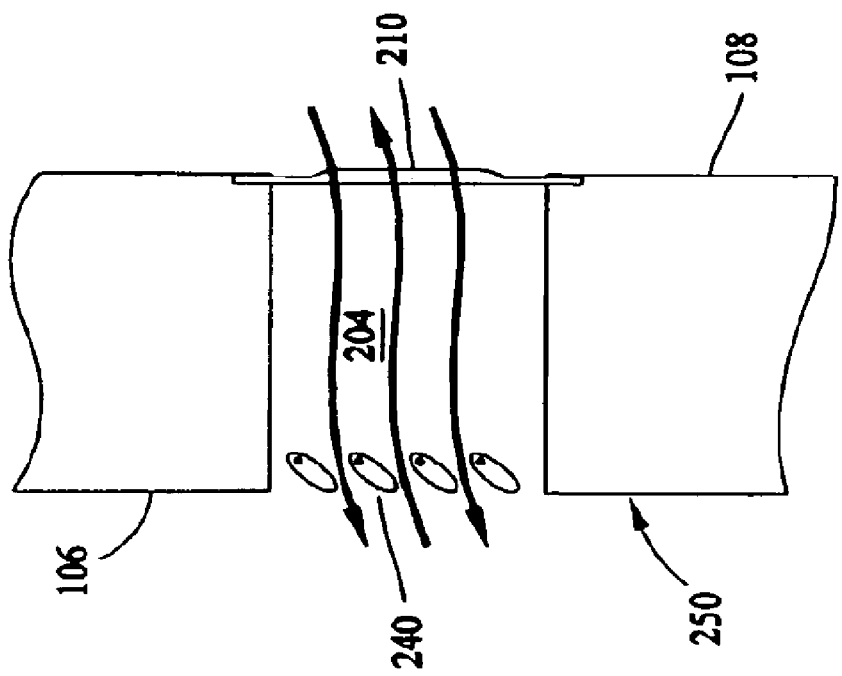
FIG. 4 is a cross sectional view of a refrigerator sidewall including another embodiment of a passageway.
Figure 3:
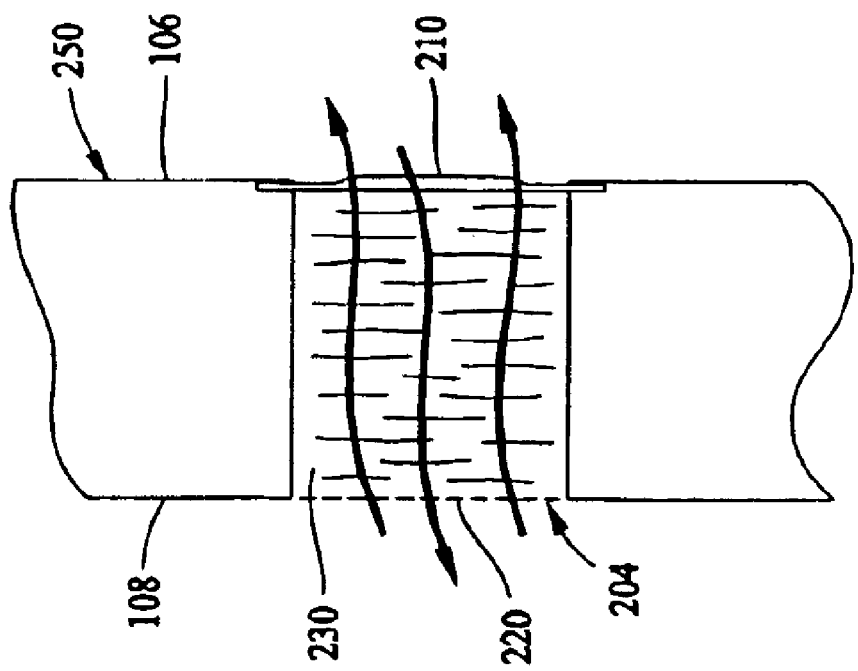
FIG. 3 is a cross sectional view of a refrigerator sidewall including a passageway.

FIG. 2 is a partial view of door 134 and the exterior sidewall 250 and top 260 of fresh food compartment 102 of refrigerator 100. Rear panel 270 is opposite door 134. Shown in sidewall 250 is a sizing member 210 which is partially obstructing a passageway 204 which is shown in more detail in FIGS. 3 and 4. Passageway 204 extends from inner panel 108 to outer case 106 in sidewall 250 and connects fresh food compartment 102 to outside air through a plurality of openings 220 which may be positioned on outer case 106 of sidewall 250 as shown in FIG. 2 or on inner liner 108 as shown in FIG. 3. In one embodiment, a filtering member 230 is positioned within passageway 204. In another embodiment, filtering member 230 is adjacent passageway 204. In another embodiment, a plurality of louvers 240 are positioned at one end of passageway 204. Sizing member 210 is positioned on either the refrigerator exterior as shown in FIGS. 2 and 3 or the interior as depicted in FIG. 4.

Humidity control in fresh food compartment 102 is achieved by the controlled communication of outside air with fresh food compartment 102 through passageway 204. Sizing member 210 is movable to allow adjustment of air flow through passageway 204. In one embodiment, sizing member 210 is user adjustable. In another embodiment, sizing member 210 is automatically moved. Filtering member 230 facilitates keeping foreign particles from entering fresh food compartment 102 through passageway 204. In another embodiment, louvers 240 facilitate keeping foreign particles from entering fresh food compartment 102. Though shown on the sidewall 250 of refrigerator 100, in FIG. 2, in an alternative embodiment, passageway 204 is located on the refrigerator top 260 or rear panel 270 or in refrigerator door 134. Passageway 204 can be of any shape and can extend linearly as shown in FIGS. 3 and 4 or could extend at least partially arcuately between inner liner 108 and case 106. In another embodiment, passageway 204 is positioned on sealing gasket 144.

Figure 5:
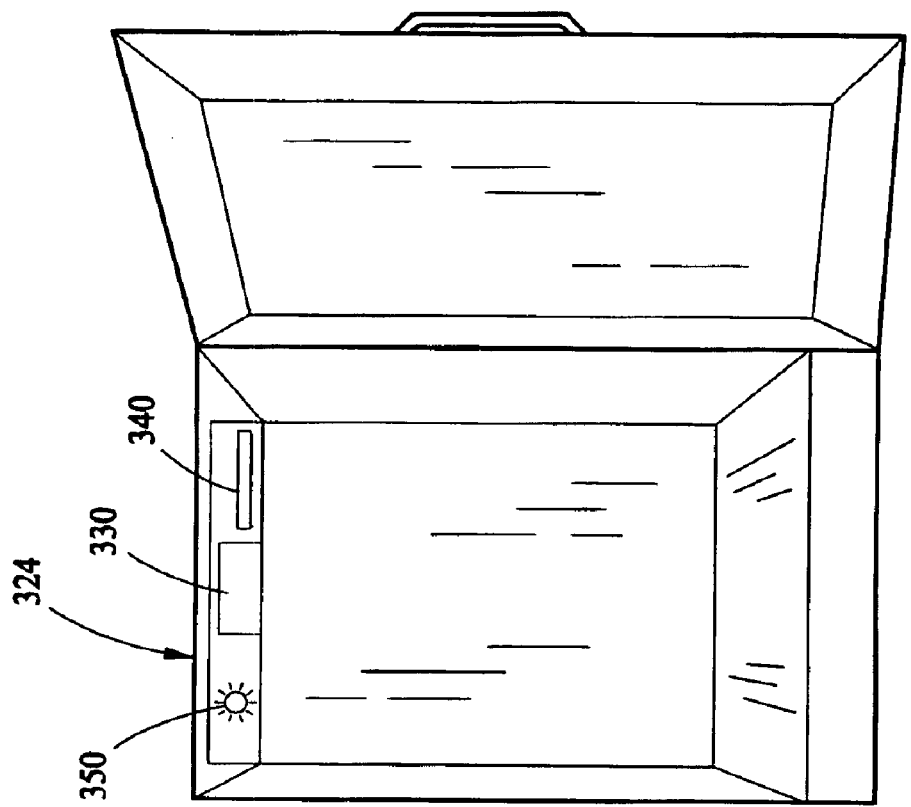
FIG. 5 is front perspective view of a refrigerator with a control interface.

FIG. 5 illustrates a control interface 324 of refrigerator 100. Interface 324 includes a humidity sensor 340 that senses the relative humidity of the air inside fresh food compartment 102, and a display panel 330 that numerically displays the sensed value. In addition to humidity control, other control features associated with the refrigerator may be incorporated into control interface 324.

Figure 6:
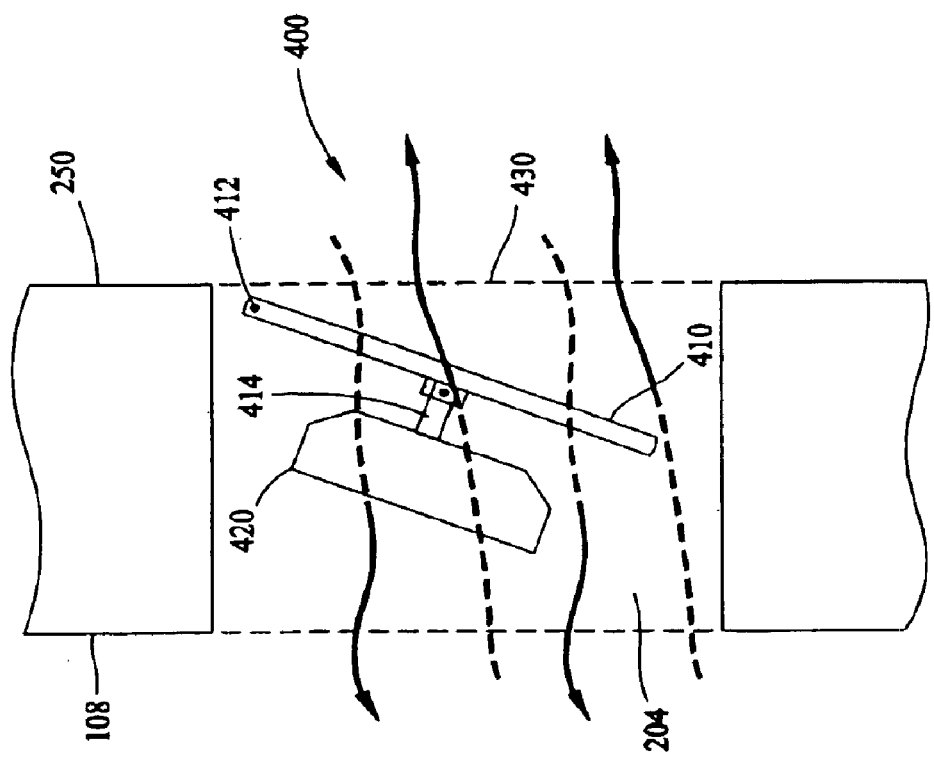
FIG. 6 is a cross sectional view of a refrigerator side wall with an automatically controlled vent.

Control interface 324 provides for automatic operation of the humidity control system. In FIG. 6, automatic vent 400 is shown within a side wall of refrigerator between inner liner 108 and outer case 106. Vent 400 includes a damper 410 positioned in passageway 204 and an actuator such as servomotor 420. Damper 410 is pivoted at pivot end 412 and is movable to open and close vent 400 by opening and closing air passageways 430 in the outer case. Damper 410 is connected to servomotor 420 by an actuating rod 414. Servomotor 420, controlled by the refrigerator control system, opens and closes the vent passage 400 based on the humidity level detected by sensor 340 and a humidity level selected by the user through an adjustment dial 350. For example, control interface 324 receives a relative humidity setting from a user and controls actuator 420 to maintain the humidity level in fresh food compartment 102 about the selected humidity level. In one embodiment, the relative humidity is maintained within 2% of the received setting. That is, for a selected setting of 70%, the relative humidity within fresh food compartment 102 is maintained within the range of 68% to 72%. In another embodiment, the relative humidity is maintained within 4% of the selected level. Alternatively, in another embodiment, control interface 324 maintains the relative humidity within 8% of the selected level.

While the invention has been described in terms of various specific embodiments, those skilled in the art will recognize that the invention can be practiced with modification within the spirit and scope of the claims.

What is claimed is:

1. A refrigerator comprising:
   a refrigerating compartment configured to preserve food, said compartment comprising a plurality of walls forming a cavity;
   a door coupled to said compartment configured to cover said cavity when in a closed position;
   a passageway positioned on at least one of said walls and said door such that air within said cavity is in flow communication with air outside said cavity when said door is in the closed position, said passageway extending between an inner and an outer sidewall of said cavity;
   a filtering member disposed within said passageway to facilitate keeping foreign particles from entering said cavity through said passageway;
   a relative humidity sensor positioned to sense the relative humidity within said cavity; and
   a relative humidity display positioned within said cavity.

2. A refrigerator in accordance with claim 1 wherein said filtering member comprises a mesh filter.

3. A refrigerator in accordance with claim 1 wherein said filtering member comprises a plurality of louvers.

4. A refrigerator in accordance with claim 1 further comprising a user interface operationally coupled to said relative humidity sensor, said interface configured to:
   receive a relative humidity setting; and
   maintain the relative humidity within said cavity about said setting.

5. A refrigerator in accordance with claim 1 further comprising a user interface operationally coupled to said cavity, said interface configured to:

receive a relative humidity setting; and maintain the relative humidity within said cavity about said setting.

6. A refrigerator comprising;

a refrigerating compartment configured to preserve food, said compartment comprising a plurality of walls forming a cavity;

a door coupled to said compartment configured to cover said cavity when in a closed position;

a passageway positioned on at least one of said walls and said door such that air within said cavity is in flow communication with air outside said cavity when said door is in the closed position, said passageway extending between an inner panel and an outer sidewall of said cavity;

a filtering member disposed within said passageway to facilitate keeping foreign particles from entering said cavity through said passageway; and a sizing member operationally coupled to said passageway and configured to adjust the amount of flow communication between air within said cavity and air outside said cavity.

7. A refrigerator in accordance with claim 6 wherein said sizing member configured to be user controllable.

8. A refrigerator in accordance with claim 6 further comprising a user interface operationally coupled to said cavity, said interface configured to:

receive a relative humidity setting; and maintain the relative humidity within said cavity about said setting using said sizing member.

9. A refrigerator in accordance with claim 6 wherein said passageway positioned in at least one of said walls.

10. A refrigerator in accordance with claim 6 wherein said passageway positioned in said door.

11. A refrigerator comprising:

a refrigerating compartment configured to preserve food, said compartment comprising a plurality of walls forming a cavity;

a door coupled to said compartment configured to cover said cavity when in a closed position; and a gasket positioned between said compartment and said door when said door is in the closed position, and a passageway positioned in said gasket such that air within said cavity is in flow communication with air outside said cavity when said door is in the closed position.

12. A refrigerator in accordance with claim 11 wherein said gasket attached to said door.

13. A refrigerator in accordance with claim 11 wherein said gasket attached to said compartment.

14. A refrigerator comprising:

a refrigerating compartment configured to preserve food, said compartment comprising a plurality of walls forming a cavity;

a door coupled to said compartment configured to cover said cavity when in a closed position; and a user interface operationally coupled to said cavity, said interface configured to:

receive a relative humidity setting; and maintain the relative humidity within said cavity about said received relative humidity setting by controlling an exchange of outside air with said cavity.

15. A refrigerator in accordance with claim 14 further comprising a relative humidity display operationally coupled to said interface.

16. A method for manufacturing a refrigerator, said method comprising:

forming a refrigerating compartment configured to preserve food, the compartment comprising a plurality of walls forming a cavity;

coupling a door to the compartment such that the door covers the cavity when in a closed position;

coupling a passageway to at least one of the compartment and the door such that air within the cavity is in flow communication with air outside the cavity when the door is in the closed position, the passageway extending between an inner panel and an outer sidewall of the compartment;

locating a filtering member within the passageway such that foreign particles are inhibited from entering the cavity through the passageway; and coupling a sizing member to the passageway, the sizing member configured to adjust the amount of flow communication between air within the cavity and air outside the cavity.

* * * * *

UNITED STATES PATENT AND TRADEMARK OFFICE
CERTIFICATE OF CORRECTION

| | | |
|---|---|---|
| PATENT NO. | : 6,904,761 B2 | Page 1 of 1 |
| APPLICATION NO. | : 10/240032 | |
| DATED | : June 14, 2005 | |
| INVENTOR(S) | : Rafalovich et al. | |

It is certified that error appears in the above-identified patent and that said Letters Patent is hereby corrected as shown below:

In Claim 1, column 4, line 46, after "inner" insert -- panel --.

Signed and Sealed this

Ninth Day of January, 2007

JON W. DUDAS
*Director of the United States Patent and Trademark Office*

UNITED STATES PATENT AND TRADEMARK OFFICE
CERTIFICATE OF CORRECTION

PATENT NO. : 6,904,761 B2  
APPLICATION NO. : 10/249032  
DATED : June 14, 2005  
INVENTOR(S) : Rafalovich et al.

It is certified that error appears in the above-identified patent and that said Letters Patent is hereby corrected as shown below:

In Claim 1, column 4, line 46, after "inner" insert -- panel --.

This certificate supersedes Certificate of Correction issued January 9, 2007.

Signed and Sealed this

Sixth Day of February, 2007

JON W. DUDAS  
*Director of the United States Patent and Trademark Office*